April 9, 1940.  L. C. SURPRENANT  2,196,615

SOUND DEADENER

Filed Feb. 4, 1938

Inventor
Leonard C. Surprenant
By Willis F. Avery
Atty.

Patented Apr. 9, 1940

2,196,615

UNITED STATES PATENT OFFICE 2,196,615

SOUND DEADENER

Leonard C. Surprenant, Akron, Ohio, assignor to The B. F. Goodrich Company, New York, N. Y., a corporation of New York Application February 4, 1938, Serial No. 188,638

1 Claim. (Cl. 189—34)

This invention relates to vehicle bodies such as automobiles, airplanes, trains, and other metallic structures subject to vibration, and has as its principal object to decrease the objectionable noises developed as a result of the vibration of such structures by quickly dampening the vibrations therein.

I have discovered that by covering at least part of a metallic panel with thin sheet metal I am able to decrease greatly the noise caused by the vibration thereof. Any kind of metallic sheet may be employed, though the softer metals like tin and lead appear to be less effective than the harder metals and alloys like brass, iron, and steel. The thickness of the metal may be varied within wide limits, depending upon the amount of sound-deadening required and the efficiency of the particular sound deadener used. Thus iron and aluminum .015 inch thick gave excellent results. Tin plate, which is iron thinly coated with tin, was found to be an excellent sound deadener when applied in the form of plates .006 in. thick. Tin foil .003 in. thick had some effect as a sound deadener when cemented to a freely vibrating panel, but was decidedly inferior to thicker tin plates and to thin plates of harder metals.

The invention may be better understood by referring to the accompanying drawing in which.

Figure 1:
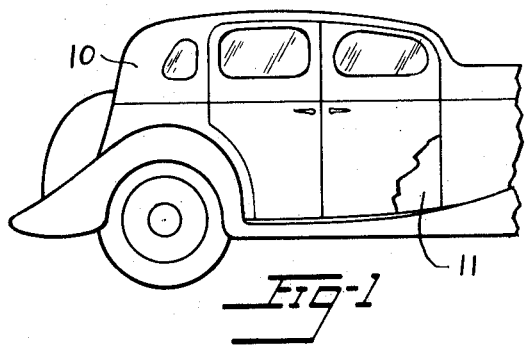
Fig. 1 is a side elevation of an automobile body, partly broken away.
Figure 2:
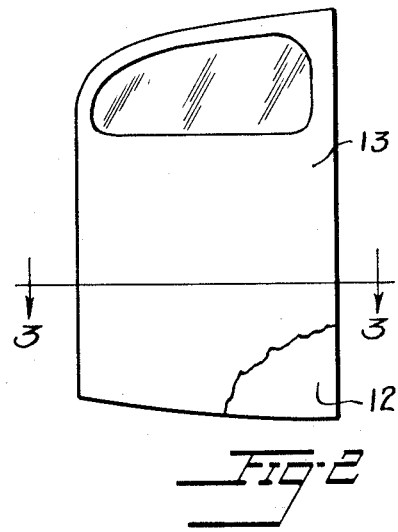
Fig. 2 is an elevation of an automobile door showing a preferred embodiment of the invention.
Figure 3:
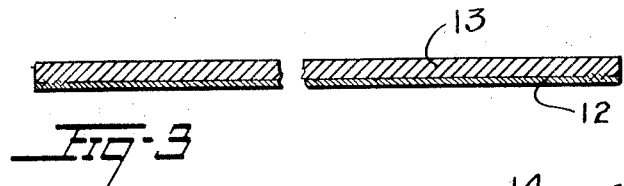
Fig. 3 is a section on line 3—3 of Fig. 2.
Figure 4:
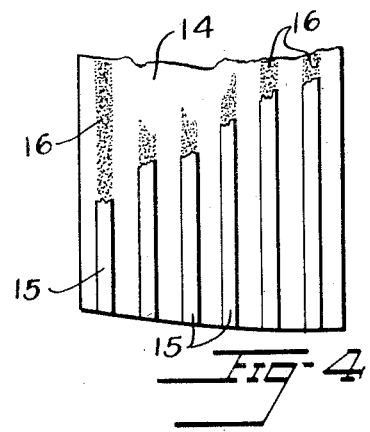
Fig. 4 is an elevation of an automobile door partly broken away showing a modified form of the invention.
Figure 5:
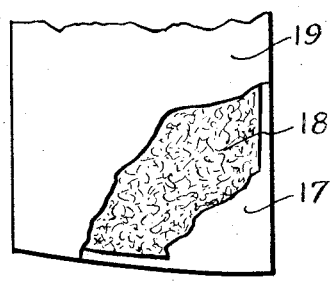
Fig. 5 is a view similar to that in Fig. 4 showing a further embodiment of the invention.

Referring to the drawing, the automobile body 10 is lined on the inside with a thin metallic sheet 11 applied by any desired means. It is unnecessary to adhere the sheet to the body over the entire surface. Thus the tin plate 12 was spot-welded to the automobile door 13 at sufficient points to hold the sheet in contact with the body. The sheets may also be applied by cementing with rubber cement over the entire contact area, clamping at the edges, spot-welding at the edges, or cementing at the edges. When test panels were covered with a tin plate .008 in. thick by all of the above methods, and the panels were caused to vibrate, it was found that the metallic sheet applied by any of these methods was such a good sound deadener that individual differences could not be detected.

Although for the best results the metallic panels should be entirely covered with the thin metallic plate, covering part of the surface has been found to have beneficial effects. In one modification the panel 14 was covered with evenly spaced metal strips 15 one inch wide adhered thereto by rubber cement 16. The relationship between the area covered and the sound deadening efficiency was roughly determined by a series of tests in which a panel 20 x 20 inches in area was covered with .008 in. tin plate by cementing with rubber cement over the entire contact area, and other similar panels were partly covered with tin plate by the same method. The ratings given below are the number of seconds before the noise emitted by the panel ceased when the panel was suspended and struck with a hard rubber mallet.

| No. pieces of tin plate | Size each piece tin plate | Geometric arrangement | Seconds before vibration ceased |
|---|---|---|---|
| 1 | 20 x 20" | Complete coverage | 1 |
| 1 | 20 x 8" | Centered—parallel to two edges | 5 |
| 4 | 20 x 4" | Evenly spaced in one direction | 5 |
| 8 | 20 x 1" | do | 10 |
| 12 | 20 x 1" | Eight strips evenly spaced in one direction—four strips evenly spaced perpendicular. | 8 |

It will be readily seen that many other modifications may be evolved whereby the desired results are obtained by covering only parts of the structure. It is also within the scope of this invention to use sheets with openings therein as sound deadeners, as, for instance, a strip of iron plate in which circular or rectangular openings have been made at regular or irregular intervals. The use of strips of sheet material is especially advantageous where the sound deadener has to be formed around corners and other curved or bent surfaces.

In some cases, and particularly when sheets of the softer metals are being used, it is desirable to include a strip of fibrous material between the vibrating structure and the sheet metal. Paper such as blotting paper or kraft paper and Bagasse fiber felt either alone or in combination with cardboard as a backing are excellent materials. Other fibers such as those obtained from old rubber tires may also be used. In one modification, the panel 17 was covered with a fibrous sheet 18 and thin tin plate 19 which was spot-welded to the panel. This construction dampened any vibrations in the panel in a very short space of time. The fibrous sheet material may be either plain, or embossed to produce irregular surfaces such as a waffle or diamond design. The fibrous sheet material may also be impregnated with asphalt or other bitumens. When fibrous sheets are employed, they are usually laid on the surface of the vehicle body, and the thin metal plate is applied and welded or cemented at the edges.

Although I have herein disclosed specific embodiments of my invention, I do not intend to limit myself solely thereto, for it is obvious that many modifications such as substituting equivalent materials and varying the dispositions of the materials with respect to each other and to the vehicle body may be made without departing from the spirit of the invention as defined in the appended claim.

I claim:

Means for damping vibrations in a substantially flat panel of a sheet metal structure, said means comprising a separate sheet of metal which is much thinner than the metal of the panel and is in direct contact with a major portion of the surface of the panel, and is fastened to the panel only at widely-spaced intervals.

LEONARD C. SURPRENANT.